US007452276B2

(12) United States Patent
Loose et al.

(10) Patent No.: US 7,452,276 B2
(45) Date of Patent: Nov. 18, 2008

(54) SIMULATION OF MECHANICAL REELS ON A GAMING MACHINE

(75) Inventors: Timothy C. Loose, Chicago, IL (US); Jacob C. Greenberg, Rolling Meadows, IL (US)

(73) Assignee: WMS Gaming Inc., Waukegan, IL (US)

( * ) Notice: Subject to any disclaimer, the term of this patent is extended or adjusted under 35 U.S.C. 154(b) by 862 days.

(21) Appl. No.: 10/077,443

(22) Filed: Feb. 15, 2002

(65) Prior Publication Data

US 2003/0157980 A1 Aug. 21, 2003

(51) Int. Cl.
*A63F 13/00* (2006.01)

(52) U.S. Cl. .......................................... 463/31; 463/20

(58) Field of Classification Search ..................... 463/1, 463/46, 47, 16–21, 30–32; 273/143 R, 138 A, 273/138.1, 138.2, 138 R; 385/115, 120; 313/422

See application file for complete search history.

(56) References Cited

U.S. PATENT DOCUMENTS

| | | | | |
|---|---|---|---|---|
| 4,448,419 A | | 5/1984 | Telnaes | 463/21 |
| 4,454,670 A | | 6/1984 | Bachmann et al. | 194/350 |
| 4,517,558 A | | 5/1985 | Davids | 340/700 |
| 4,718,672 A | | 1/1988 | Okada | 273/143 R |
| 4,875,144 A | | 10/1989 | Wainwright | 362/103 |
| 5,152,529 A | | 10/1992 | Okada | 273/143 R |
| 5,375,043 A | | 12/1994 | Tokunanga | 362/31 |
| RE35,188 E | | 3/1996 | Howard | 273/143 R |
| 5,580,055 A | * | 12/1996 | Hagiwara | 273/143 R |
| 5,725,210 A | | 3/1998 | Yamaguchi et al. | 273/121 |
| 5,752,881 A | | 5/1998 | Inoue | 273/143 R |
| 5,873,645 A | * | 2/1999 | Belfer | 362/551 |
| 5,934,672 A | | 8/1999 | Sines et al. | 273/143 R |
| 6,027,115 A | | 2/2000 | Griswold et al. | 273/143 R |

(Continued)

FOREIGN PATENT DOCUMENTS

| | | |
|---|---|---|
| EP | 0 789 338 A1 | 8/1997 |

(Continued)

OTHER PUBLICATIONS

Brochure for "3RV", WMS Gaming Inc., Waukegan, IL, 2 pages, undated.

(Continued)

*Primary Examiner*—Scott E Jones
(74) *Attorney, Agent, or Firm*—Nixon Peabody LLP

(57) ABSTRACT

A spinning reel slot machine has increased versatility, while having reels that are aesthetically similar to traditional mechanical reels. In one embodiment, the slot machine includes a plurality of optical fibers having first ends optically coupled to a surface of an image display device and seconds ends defining a curved display surface for displaying simulated mechanical reels to a player. In another embodiment, one or more of the mechanical reels has a transparent window at a location where a symbol would normally be present. A video display displays a video symbol in the transparent window. In yet a further embodiment, one of the plurality of mechanical reels has a miniature image display located at selected ones of the symbol regions for providing video symbols for the game. In yet further embodiments, a symbol region can produce more than one symbol in response to exposure at certain wavelengths or polarizations of light.

25 Claims, 9 Drawing Sheets

U.S. PATENT DOCUMENTS

| | | | | |
|---|---|---|---|---|
| 6,036,188 | A | 3/2000 | Gomez et al. | 273/118 R |
| 6,038,188 | A | 3/2000 | Akamatsu | 365/226 |
| 6,056,642 | A | 5/2000 | Bennett | 463/20 |
| 6,068,552 | A | 5/2000 | Walker et al. | 463/21 |
| 6,135,884 | A | 10/2000 | Hedrick et al. | 463/20 |
| 6,164,645 | A | 12/2000 | Weiss | 273/138.2 |
| 6,368,216 | B1 | 4/2002 | Hedrick et al. | 463/20 |
| 6,471,387 | B1 * | 10/2002 | Henshaw et al. | 362/555 |
| 6,497,617 | B1 | 12/2002 | Yoshida | 463/20 |
| 6,517,433 | B2 | 2/2003 | Loose et al. | 463/20 |
| 7,160,187 | B2 | 1/2007 | Loose et al. | 463/20 |
| 7,166,029 | B2 | 1/2007 | Enzminger | 463/20 |
| 2002/0173354 | A1 | 11/2002 | Winans et al. | 463/20 |
| 2003/0060269 | A1 | 3/2003 | Paulsen et al. | 463/20 |
| 2003/0157980 | A1 | 8/2003 | Loose et al. | 463/20 |
| 2004/0029636 | A1 | 2/2004 | Wells | 463/32 |
| 2004/0192430 | A1 | 9/2004 | Burak et al. | 463/20 |
| 2004/0198485 | A1 | 10/2004 | Loose et al. | 463/20 |
| 2004/0266515 | A1 | 12/2004 | Gauselmann | 463/20 |
| 2005/0140088 | A1 | 6/2005 | Randall | 273/143 R |
| 2005/0153775 | A1 | 7/2005 | Griswold | 463/30 |
| 2005/0255908 | A1 | 11/2005 | Wells | 463/20 |
| 2006/0014580 | A1 | 1/2006 | Hawthorn | 463/20 |
| 2006/0135248 | A1 | 6/2006 | Anderson et al. | 463/22 |
| 2006/0281530 | A1 | 12/2006 | Seelig et al. | 463/20 |
| 2007/0004513 | A1 | 1/2007 | Wells et al. | 463/31 |
| 2007/0010318 | A1 | 1/2007 | Rigsby et al. | 463/20 |
| 2007/0054730 | A1 | 3/2007 | Mattice et al. | 463/16 |
| 2007/0077986 | A1 | 4/2007 | Loose et al. | 463/20 |
| 2007/0149281 | A1 | 6/2007 | Gadda et al. | 463/34 |
| 2007/0228651 | A1 | 10/2007 | Loose et al. | 463/16 |

FOREIGN PATENT DOCUMENTS

| | | | |
|---|---|---|---|
| EP | 0 989 531 | A2 | 3/2000 |
| GB | 2 124 505 | | 2/1984 |
| GB | 2 349 494 | A | 11/2000 |
| GB | 2253299 | A | 2/2002 |
| JP | 10-071228 | | 3/1998 |
| JP | 2000-262738 | | 9/2000 |
| JP | 2002-113150 | | 4/2002 |
| JP | 2002-279964 | | 9/2002 |
| WO | WO 99/53454 | A1 | 10/1999 |
| WO | WO 06/039371 | A2 | 4/2006 |
| WO | WO 07/005846 | A2 | 1/2007 |
| WO | WO 07/030781 | A2 | 3/2007 |

OTHER PUBLICATIONS

Article for “The Pink Panther”, *Strictly Slots*, p. 50, Feb. 2001.
Article for “Flip Flop”, *Strictly Slots*, p. 48, Jun. 2000.

* cited by examiner

*Fig. 9b*
*Fig. 9a*
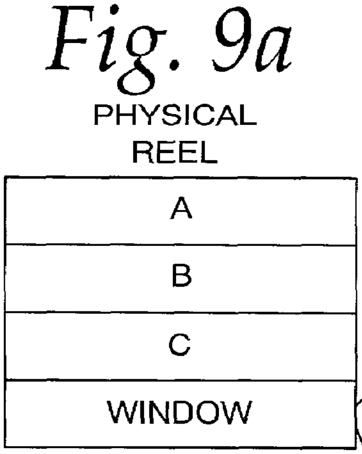
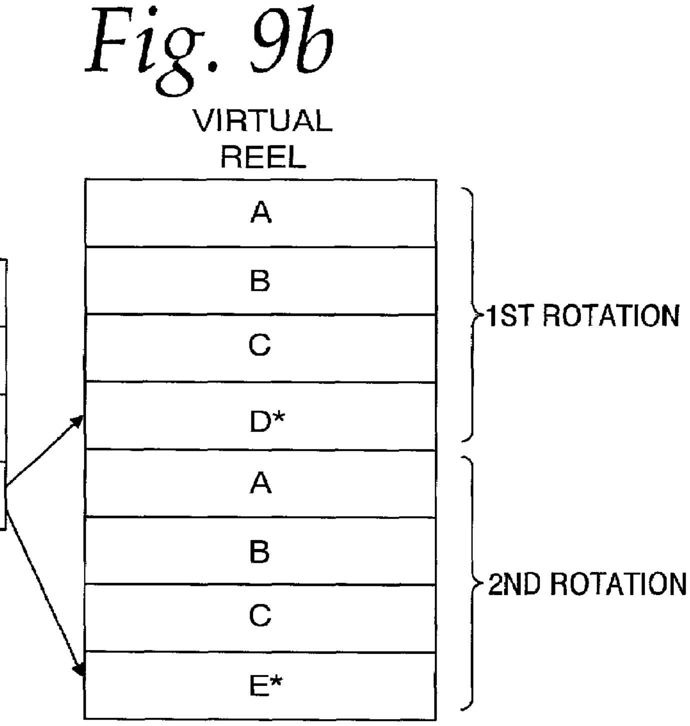
*Fig. 10a*
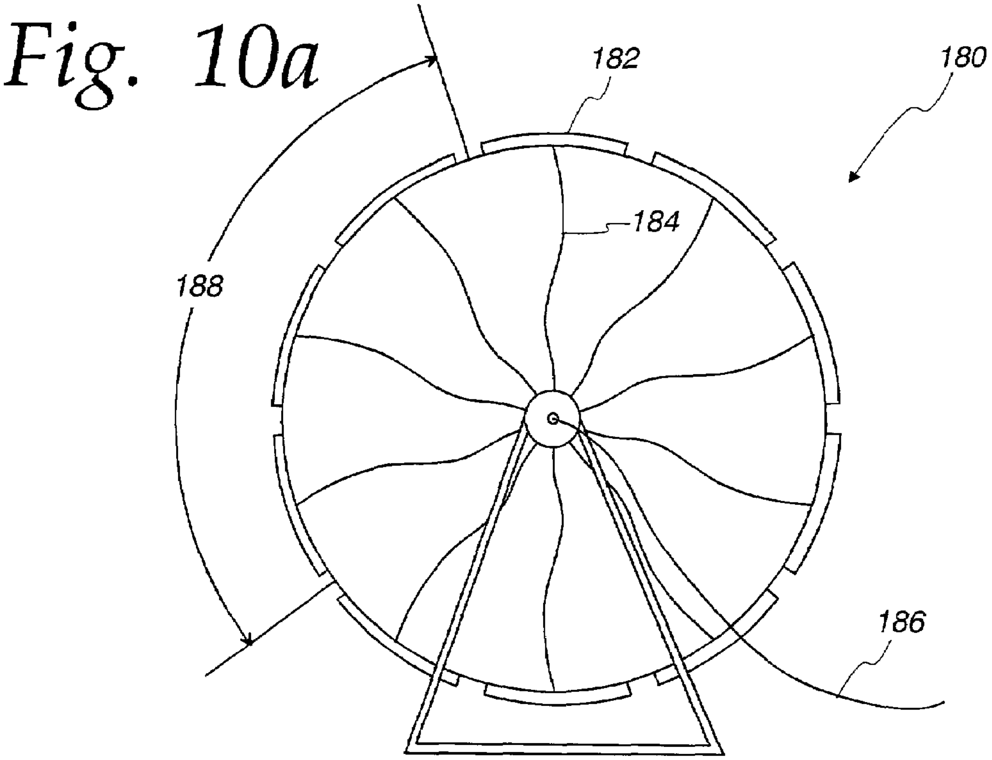

*Fig. 11*
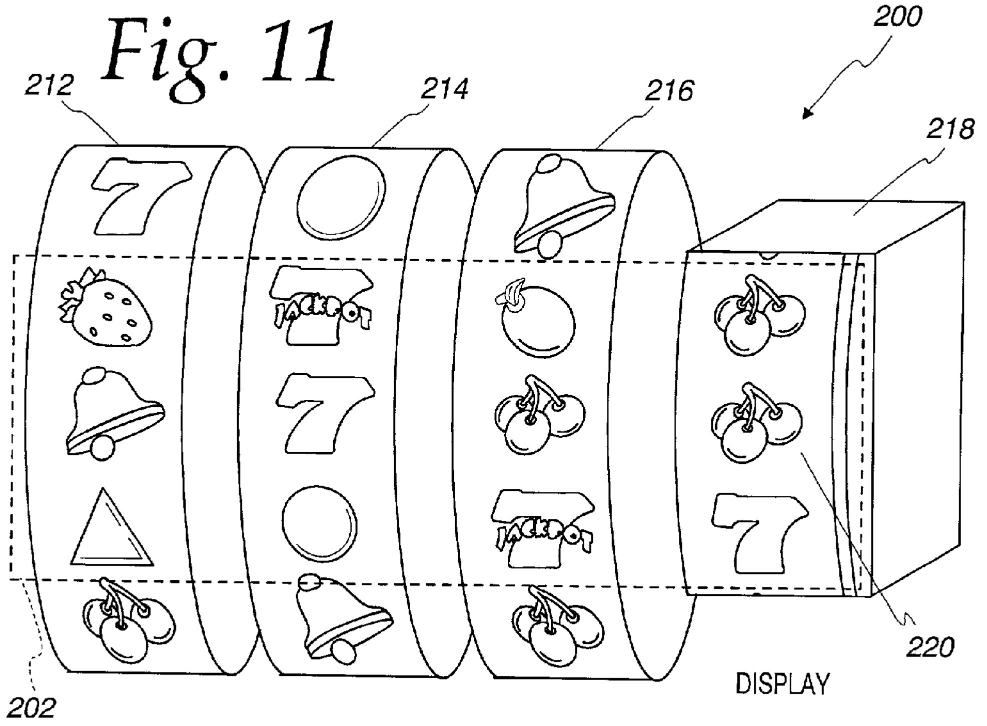
*Fig. 12a* *Fig. 12b*
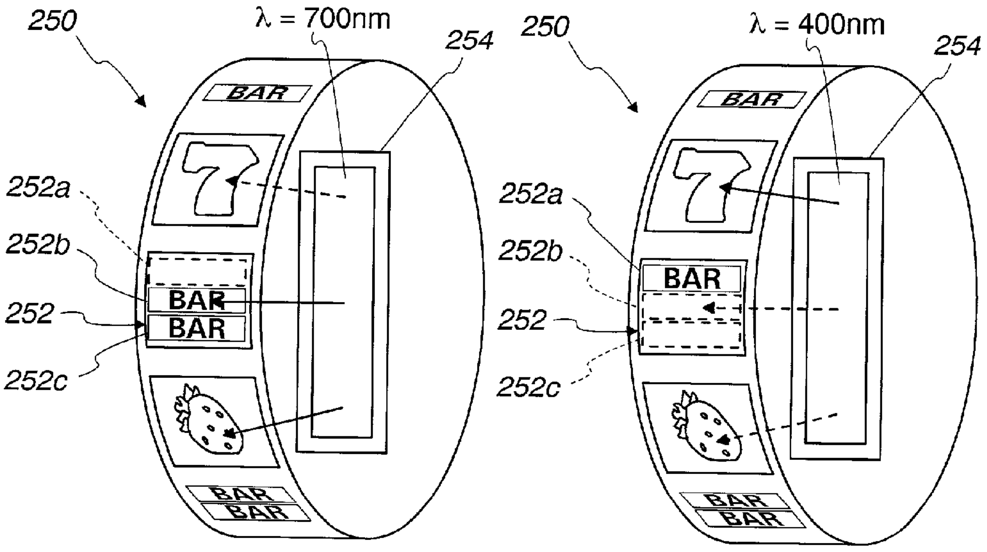

SIMULATION OF MECHANICAL REELS ON A GAMING MACHINE

FIELD OF THE INVENTION

The present invention relates generally to reel spinning slot machines and, more particularly, to a reel spinning slot machine having mechanical reels with symbol locations that can provide for multiple symbols, or simulated mechanical reels that are curved like a typical mechanical reel of the machine.

BACKGROUND OF THE INVENTION

A slot machine generally comprises a plurality of reels controlled by a processor. In response to a wager, the processor randomly selects an outcome from a plurality of possible outcomes and then causes the reels to be stopped to display the selected outcome. The selected outcome is represented by certain symbols on the reels being in visual association with a display area. If the selected outcome corresponds to a winning outcome identified on a pay table, the processor instructs a payoff mechanism to award a payoff for that winning outcome to the player in the form of coins or credits.

Slot machines are generally available in two different types. First, a video-based slot machine depicts the symbol-bearing reels on a video display. Second, a mechanical slot machine includes mechanical reels driven by stepper motors.

In prior art machines having mechanical reels, the display area of reel spinning slot machines is fairly mundane. Several proposals to modify the appearance of the display area have been set forth. For example, the reels may contain electroluminescent elements that define one or more reel symbols, such as diamonds, cherries or bars, where the characteristics of the reel symbols change based on inputs to the electroluminescent elements. In another proposal, the reel symbols are colored by backlighting the symbols with colored light bulbs or similar means.

Video-based slot machines allow for flexibility in game design and multi-denominational play and do not require any additional hardware for implementing bonus games. With respect to flexibility in game design, the video display of a video-based slot machine can depict complex and entertaining graphical images, animations, and play sequences that cannot be employed in mechanical slot machines. With respect to flexibility in multi-denominational play, the game (e.g., reel symbol distribution and pay table) can easily be modified to vary the theoretical payback percentage in response to a player's selection of different coin denominations for game play. Such game modifications are not easily made to mechanical slot machines. Further, video-based slot machines do not require any additional hardware for implementing bonus games because the bonus game may be depicted on the primary video display and executed by the same game controller used to execute the video slot game.

Video-based slot machines and mechanical slot machines generally appeal to different segments of the market. Although many players are attracted to the complex and entertaining graphical images, animations, and play sequences afforded by video-based slot machines, many traditionalists are still drawn to mechanical slot machines because they are simplistic machines that often only pay on a single pay line and only require a pull of a handle to initiate a spin of the reels. Part of the reason that these traditionalists avoid video-based slot machines is that the simulated reels on the video-based machines are markedly different in looks than standard mechanical reels. This is primarily due to the generally flat nature of the video screen displaying the images. While there may be some slight curvature, the curvature on the video screen does not nearly approximate the curvature of a traditional mechanical reel.

It would be beneficial to incorporate some of the features of the video-based slot machines into a traditional mechanical slot machine because of the flexibility that these video-based machines offer. To increase the popularity of video-based slot machines, efforts have been made to promote such machines at gaming establishments and in print advertising mediums. Despite such efforts, many traditionalists remain loyal to mechanical slot machines and generally avoid video-based slot machines. A need exists for a slot machine having video-based capabilities, while still preserving the simplistic rotation of mechanical reels that traditionalists appreciate in the traditional mechanical slot machine.

SUMMARY OF THE INVENTION

The present invention solves the aforementioned problems by providing a spinning reel slot machine having increased versatility, while having reels that are aesthetically similar to the traditional mechanical reels.

In one embodiment, the slot machine includes an image display device having a surface for producing images of simulated mechanical reels. The simulated mechanical reels, in response to a wager, move across the surface and stop to place symbols on the simulated mechanical reels in random orientations on the surface. A plurality of optical fibers have first ends optically coupled to the surface of the image display device and seconds ends for displaying the simulated mechanical reels to a player of said slot machine. At least some of the second ends define a curved display surface with a radius of curvature that approximates the radius of curvature of a mechanical reel.

In another embodiment, the slot machine includes a plurality of mechanical reels that, in response to a wager, are rotated and stopped to randomly place symbols on the reels in visual association with a display area. One or more of the mechanical reels has a transparent window at a location where a symbol would normally be present. A video display is located behind the reel with the window and is in alignment with the display area. The video display displays a video symbol when the transparent window stops in the display area. Thus, the video symbol is observable through the transparent window by a player of the slot machine.

In a further embodiment, a spinning reel slot machine includes a plurality of mechanical reels that, in response to a wager, are rotated and stopped to randomly place symbol regions on the plurality of reels in visual association with a display area. At least one of the plurality of mechanical reels has a miniature image display located at a selected one or more of the symbol regions. The miniature image display provides video symbols for the game.

In yet further embodiments, a symbol region on a reel has first features that are visible in response to exposure at a certain wavelength or polarization of light and second features that are visible in response to exposure to a second wavelength or a second polarization of light. The first features define a first symbol in the symbol location and the second features define a second symbol in the symbol location. The wavelength or polarization of a light source is controlled by the machine to develop the first or second symbols.

The above summary of the present invention is not intended to represent each embodiment, or every aspect, of the present invention. This is the purpose of the Figures and the detailed description which follow.

BRIEF DESCRIPTION OF THE DRAWINGS

The foregoing and other advantages of the invention will become apparent upon reading the following detailed description and upon reference to the drawings.

FIGS. 9*a* and 9*b* illustrate the versatility provided by the increase of symbols for the reels of FIGS. 4-7.

FIG. 10*a* illustrates an alternative embodiment where a mechanical reel has a plurality of video displays on its exterior symbols at symbol locations.

FIG. 11 illustrates yet another embodiment of the present invention in which one video display for generating simulated mechanical reels accompanies a plurality of mechanical reels.

FIGS. 12*a* and 12*b* illustrate a mechanical reel with a compound symbol at one symbol location that is produced by varying wavelengths of light.

Figure 1:
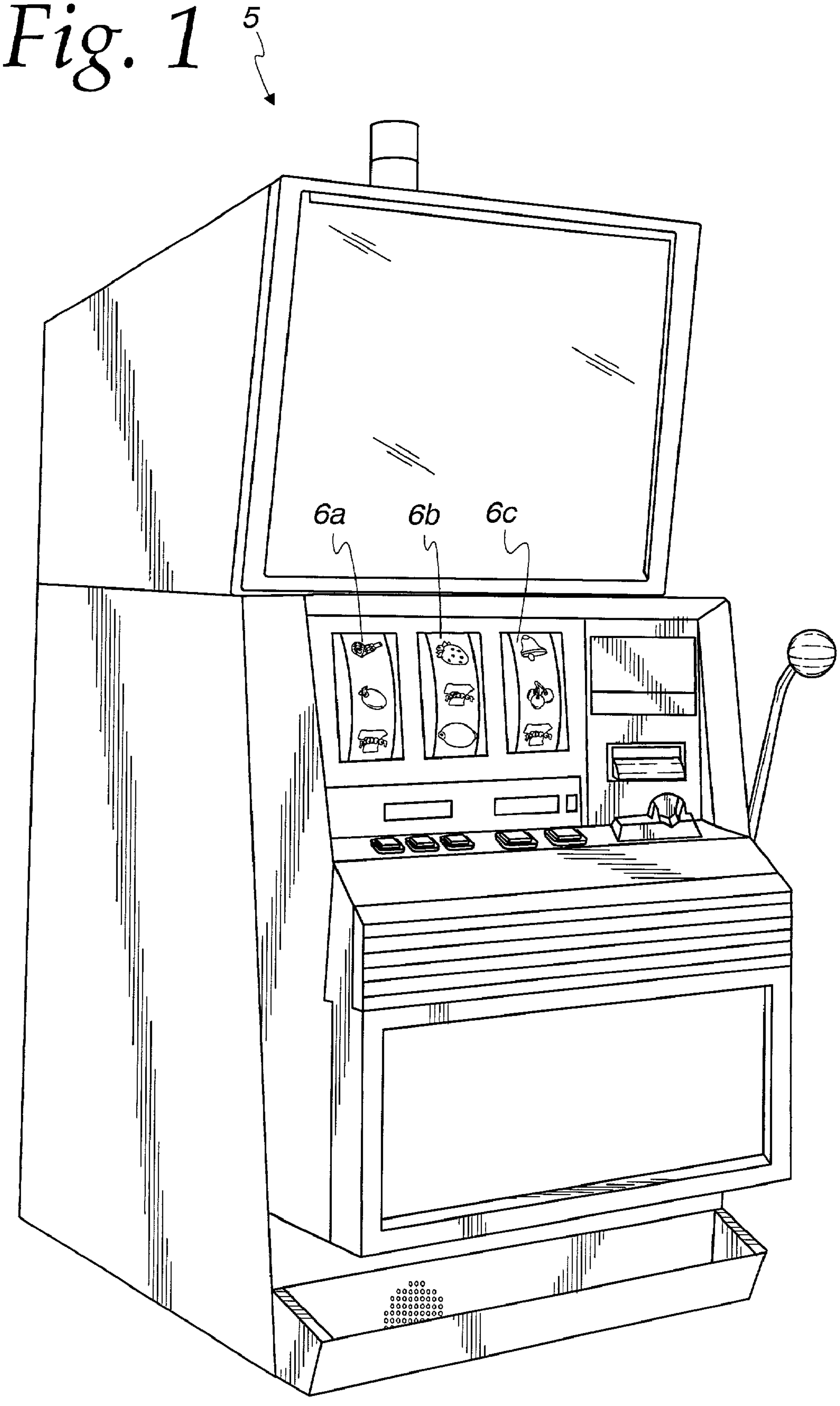
FIG. 1 illustrates a typical slot machine on which the present invention is useful.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DESCRIPTION OF ILLUSTRATIVE EMBODIMENTS

FIG. 1 illustrates a typical slot machine 5 having three reels 6*a*, 6*b*, 6*c* on which symbols are displayed. The reels 6*a*, 6*b*, 6*c* move or appear to move the symbols in response to receiving a wager from a player. The symbols, as they stop in a display region of the slot machine 5, dictate the outcome of the game for the player. The present invention described below in FIGS. 2-13 is particularly useful for this type of slot machine 5.

Figure 2:
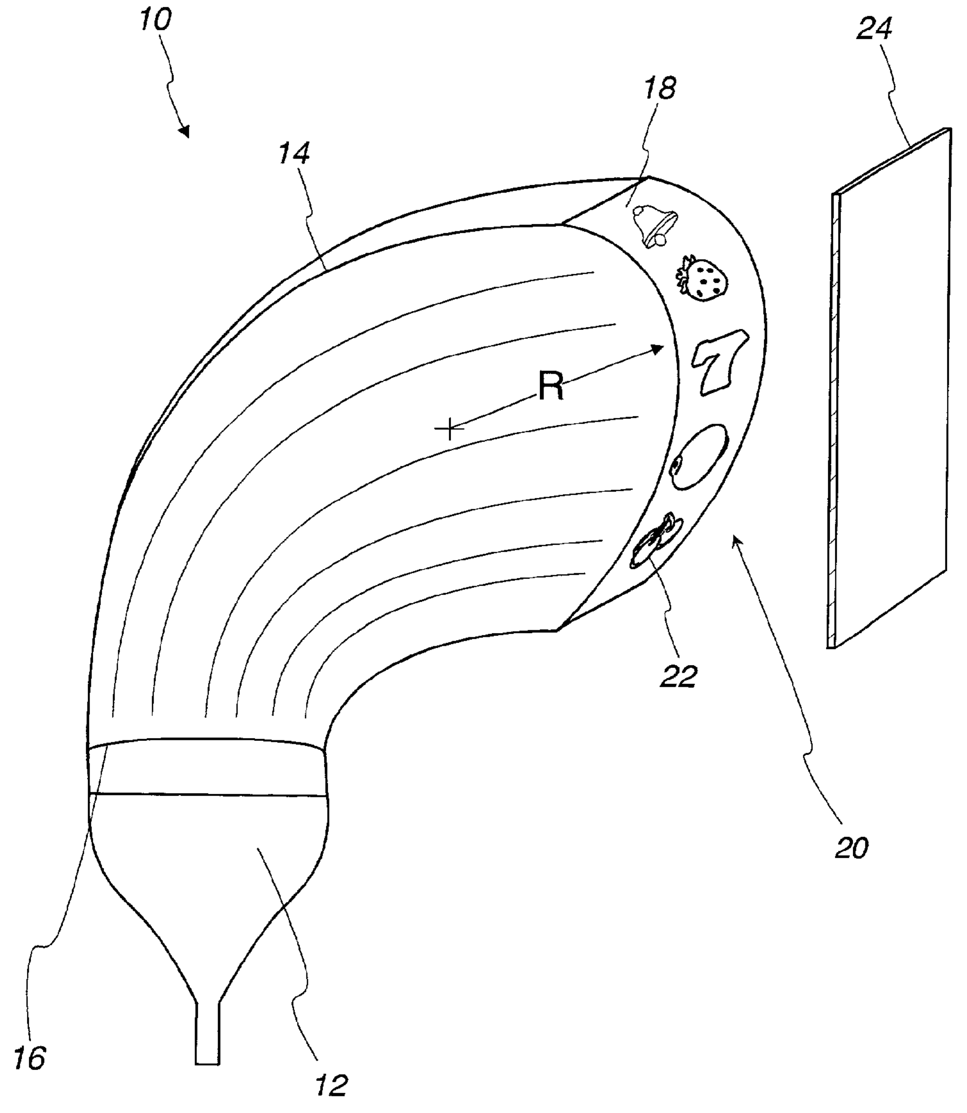
FIG. 2 is an isometric view of one embodiment of the present invention in which a simulated mechanical reel is produced by optical fibers having ends on a locus in which the radius of curvature is similar to that of a typical mechanical reel.

FIG. 2 illustrates a first embodiment of the present invention in which a mechanical reel simulation system 10 includes an image display device 12 that provides output into a fiber optic bundle 14 that is comprised of a plurality of optical fibers. The fiber optic bundle 14 has a first end 16 that is located adjacent to the image display device 12 and is optically coupled thereto. This optical coupling can be brought about by ensuring close proximity between the first end 16 of the fiber optic bundle 14 and the image display device 12 through the use of an optically transparent adhesive. The image display device 12 may be one of a variety of devices including a CRT display, liquid crystal display (LCD), dot matrix, vacuum fluorescence display, organic light emitting diode (OLED), LED array, etc.

A second end 18 of the fiber optic bundle 14 is located on a curved plane having a radius R that approximates the curvature of a typical mechanical reel. The radius is generally in the range of from about 4 to about 7 inches. Thus, the second end 18 provides a simulated mechanical reel 20 having a plurality of symbols 22. Each of the symbols 22 is produced by the image display device 12 which, in response to a wager input from a player, causes the apparent movement of the simulated reel 20 behind a glass pane 24 that isolates the reel from the player. The glass pane 24 may also include the artwork that provides additional aesthetics to the gaming machine. The apparent movement of the simulated reel 20 is caused by movement of the symbols 22 across the second end 18 of the fiber optic bundle 14.

Figure 3:
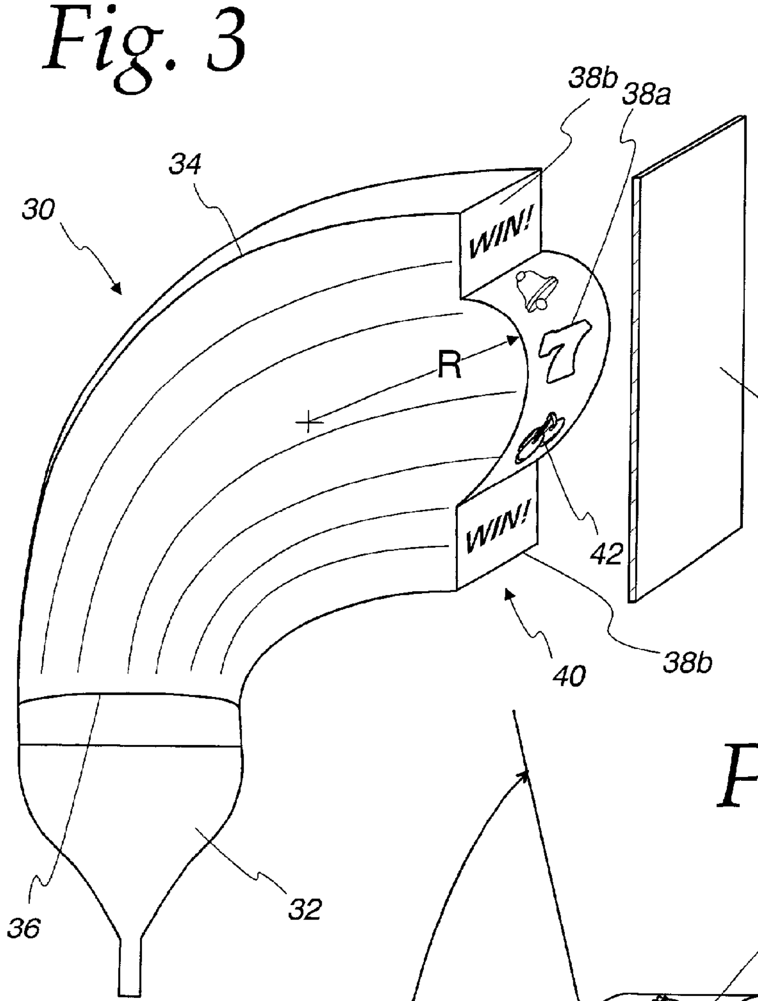
FIG. 3 is an isometric view of another embodiment of the present invention in which a simulated mechanical reel is produced by optical fibers having ends on a curved locus and on a flat plane, as well.

FIG. 3 illustrates a modified version of the system 10 of FIG. 2. A mechanical reel simulation system 30 includes an image display device 32 optically coupled to a fiber optic bundle 34 at its first end 36. The fiber optic bundle 34 has a curved second end section 38*a* and two flat second end sections 38*b*. The curved second end section 38*a* has a radius of curvature that approximates the radius of a typical mechanical reel such that the curved end section 38*a* is a simulated mechanical reel 40 having symbols 42 that are separated from a player by a glass pane 44. The flat second end sections 38*a* can be provided various bits of information (i.e., alphanumeric or symbolic) to the player of the game. Such information can be the amount of credits the player has, the time of day, advertisements, etc. In essence, the flat second end section 38*b* can serve the place of other graphical outputs that are commonly used on a gaming machine. While the flat second end section 38*b* is "flat" compared to the curved second end section 38*a*, the flat second end section 38*b* may also have some curvature, as well. Further, while the two flat second end sections 38*b* are shown as being contiguous with the curved second end section 38*a*, there can be a space that divides each of the two flat second end sections 38*b* from the curved second end section 38*a* so that the information displayed by the two flat second end sections 38*b* is separated from the curved second end section 38*a*.

In FIGS. 2 and 3, the image display device 12, 32 may create additional animation when a certain event occurs. For example, the image display device 12, 32 may display animation when a win occurs, or the image display device 12, 32 may provide some type of bonus game when a certain outcome is achieved.

Figure 4:
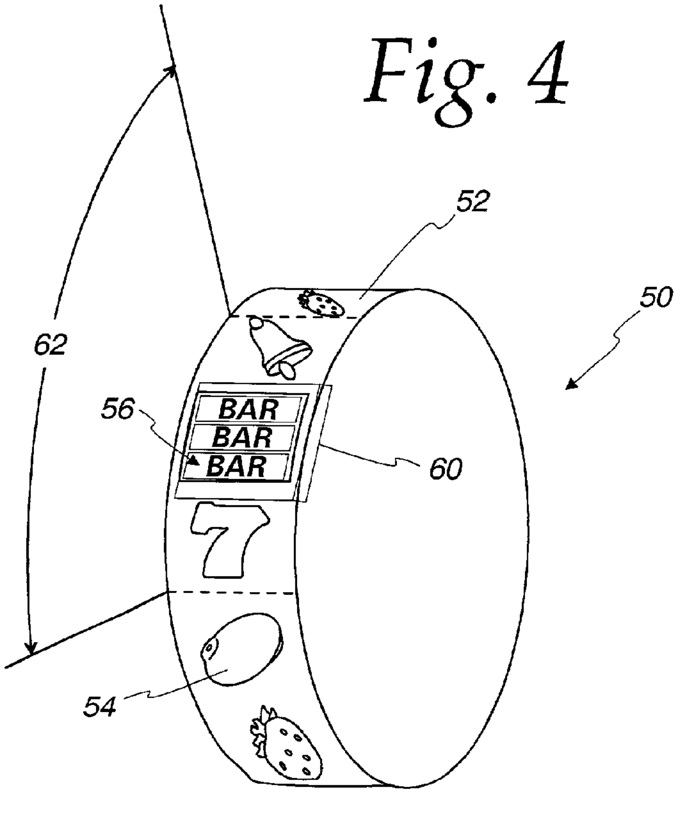
FIG. 4 is an alternative embodiment in which a mechanical reel has a transparent window and an image generator located behind the mechanical reel to display a simulated symbol through the transparent window.

FIG. 4 illustrates a mechanical reel 50 having an outer surface 52 with a plurality of symbols 54. In one of the symbol locations, a transparent window 56 is located on the outer surface 52. A video display 60 is located at a fixed position behind the mechanical reel 50 for displaying a video symbol through the transparent window 56. In the embodiment of FIG. 4, the video display 60 is slightly larger than the size of the window 56 and is located as close to the window 56 as possible. The transparent window 56 preferably is clear polymeric window, but can be glass, as well.

The player views a display region 62 of the mechanical reel 50. The display region 62 typically has several symbols 54 that are visible to the player, with the visible symbols 54 dictating the outcome of the game when they stop along a pay line or pay lines of the slot machine. Because the transparent window 56 rotates with the reel 50, it passes over the video display 60 that is located within the display region 62 with each rotation. When the window 56 passes over the video display 60, the player sees the video display 60. If the transparent window 56 stops on one of the play lines within the display region 62, then the video symbol (shown in FIG. 4 as a triple bar) is visible through the stationary transparent window 56 and dictates the outcome of the game.

The video display 60 need not be displaying a video symbol when the reel 50 is spinning at a high rate of speed since the symbols 54 are imperceptible to the human eye in this condition. The video symbol in the window 56 will be seen when the reel 50 is moving slowly and is preferably displayed for viewing in this condition. Further, because the lower edge of the transparent window 56 sweeps upwardly across the video symbol (assuming upward rotation of the reel 52), it is desirable to slightly alter the tilt angle of the video symbol (i.e., simulate tilting of the top of the video symbol in the rear direction) as the transparent window moves across the symbol. As will be described below with respect to FIGS. 9A and 9B, the video symbol in the window may be changed in each rotation of the reel 50 and, thus, the video display 60 may be toggling between various video symbols based on the number of rotations of the reel 50.

The video display 60 may be located at the general position where traditional reel backlighting would be located. The video display 60 can be a CRT display, liquid crystal display (LCD), dot matrix, vacuum fluorescence display, organic liquid crystal display (OLCD), LED array, Electronic paper, or any other display device capable of producing images.

Further, one larger video display 60 could provide the video symbols and backlighting for several reels. For example, the video display 60 may have three distinct sections, one for each reel in a three-reel slot machine, that provide backlighting or video symbols.

Figure 5:
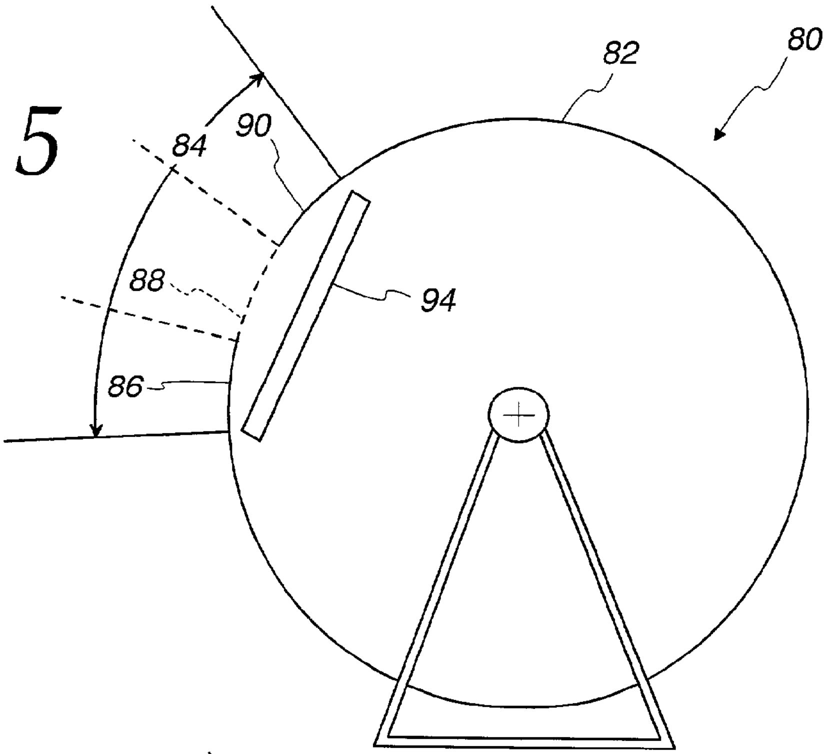
FIG. 5 is an embodiment similar to FIG. 4 in which the image generator provides an output across the entire display area.

FIG. 5 illustrates a system 80, similar to that of FIG. 4, including a mechanical reel 82 having a display region 84. The display region 84 has a width allowing for viewing of three symbols in a first symbol region 86, a second symbol region 88, and a third symbol region 90. The first symbol region 86 and the third symbol region 90 are shown in FIG. 5 as having normal symbols displayed thereon. On the other hand, the second symbol region 88 has a transparent window (i.e., dashed lines) through which a video symbol is displayed via a video display 94.

The video display 94 is large enough to cover the entire display region 84. Thus, it can be used for providing multiple video symbols if adjacent transparent windows are present on the reel 82. Further, the video display can be used as a light source for the backlighting that is provided to normal symbols. Moreover, the larger video display 94 can display the video symbol moving across its surface (with tilt angle simulation if desired on the video symbol) as the transparent window moves from the region 86 to the region 88 to the region 90. In the state shown in FIG. 5, the video display 94 is providing light, usually white light, to the first and third symbol regions 86, 90, while displaying the video symbol in the second symbol region 88. Thus, the video display 94 serves multiple functions. As discussed below with respect to FIG. 12, the video display 94 may provide varying wavelengths of light to allow one symbol region to provide different symbols (i.e., a compound symbol) depending on the wavelength of light that the video display 94 transmits.

Figure 6:
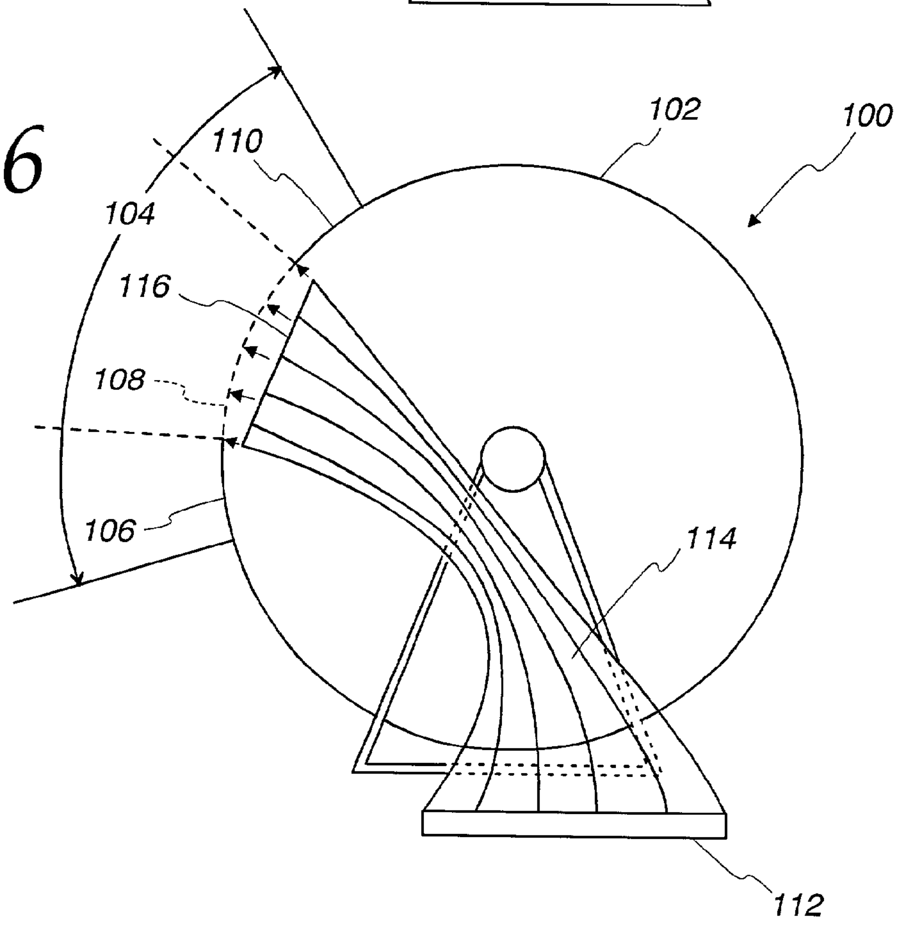
FIG. 6 is an embodiment similar to FIGS. 4 and 5 in which the image generator includes a plurality of optical fibers.

FIG. 6 depicts a system 100 having a mechanical reel 102 with a display region 104. The display region 104 is of a width allowing for viewing of three symbols in a first symbol region 106, a second symbol region 108, and a third symbol region 110. In FIG. 6, the first symbol region 106 and the third symbol region 110 have normal symbols displayed thereon. On the other hand, the second symbol region 108 has a transparent window (dashed lines).

A display device 112 develops images that are transmitted through a plurality of optical fibers 114 (e.g., a light pipe). The optical fibers 114 have an end region 116 that projects the image through the transparent window in the second window region. While shown as flat, the end region 116 may be rounded, preferably at a radius that approximates the radius of the mechanical reel 102. The display device 112 can be located outside the reel 102 (i.e., outside the cylindrical volume defined by the reel) and the optical fibers can extend into the reel 102 so as to produce the image in the transparent window. Also, the display device 112 and optical fibers 114 can serve to provide images and backlighting for several reels 102.

Figure 7:
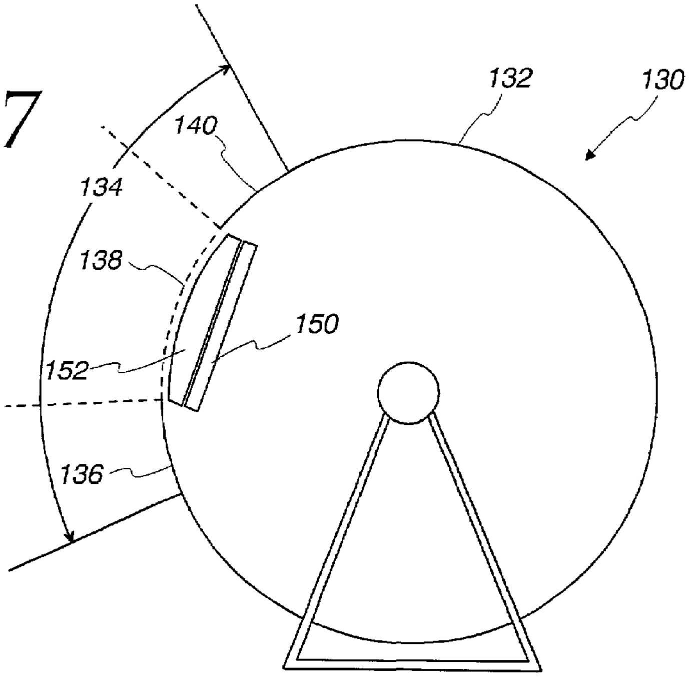
FIG. 7 is an embodiment similar to FIGS. 4 and 5 in which a lens provides curvature that is similar to the curvature of a mechanical reel.

FIG. 7 illustrates a mechanical reel system 130 having a reel 132 with a display region 134 that includes a first symbol region 136, a second symbol region 138, and a third symbol region 140. The display device 150 is positioned in the middle of the display region 134 to provide images to a transparent window in the reel 132 or backlighting for typical reel symbols. A lens 152 is located in front of the display device 150 to provide curvature to the video symbol and cause it to more resemble the symbol on the reel 152. While the lens 152 is shown as being used with a display device 150, the lens 152 may also be placed on the ends of a fiber optic bundle, such as the one shown in FIG. 6. Also, it should be noted that any of the video displays previously described could have a curved surface mimicking the curvature of the mechanical reel.

Figure 8:
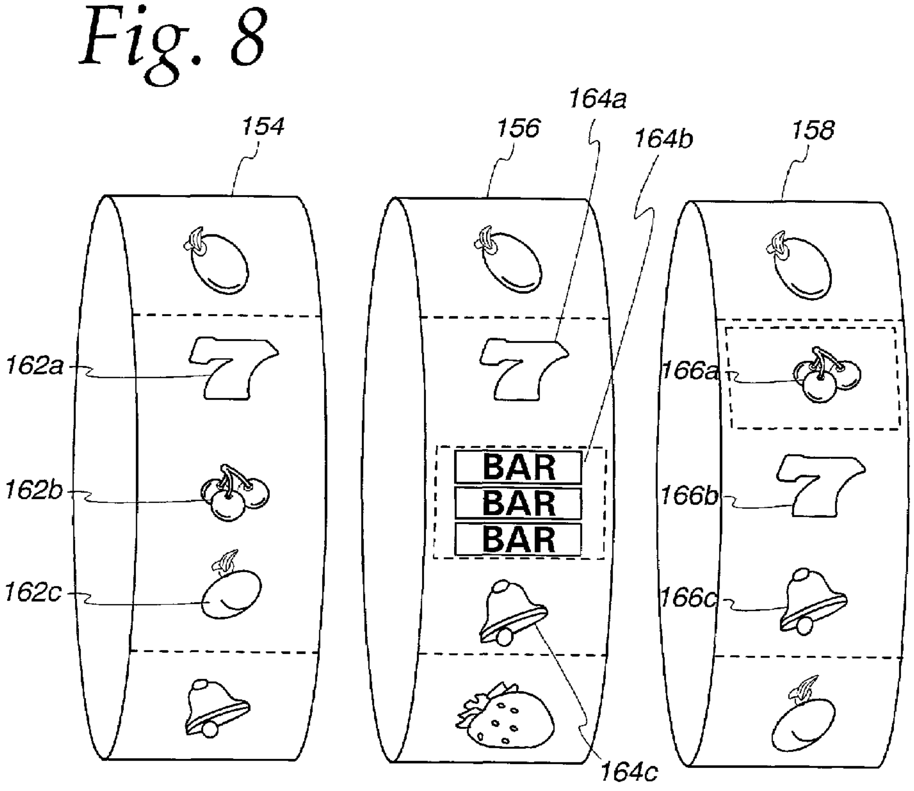
FIG. 8 is an illustration of the output from reels having transparent windows and an image generator located behind each reel.

FIG. 8 illustrates three mechanical reels 154, 156, 158 having symbols on their exterior surfaces and at least one transparent window. The dashed lines represent the display regions of the reels 154, 156, 158. The display region of the left reel 154 includes a "7" symbol at symbol position 162_a_, a "cherry" symbol at symbol position 162_b_, and an "orange" symbol at symbol position 162_c_. The display region of the middle reel 156 includes a "7" symbol at symbol position 164_a_, a transparent window 164_b_ with the video display showing a "triple bar" video symbol through the window 164_b_, and a "bell" symbol at symbol position 164_c_. The display region of the right reel 158 includes a transparent window 166_a_ with the video display showing a "cherry" video symbol through the window 166_a_, a "7" symbol at symbol location 166_b_, and a "bell" symbol at symbol location 166_c_.

By providing the transparent windows on each of the reels 154, 156, 158, the slot machine is provided with more flexibility in altering the theoretical payout table of the machine. For example, if it were desired to increase the percentage of winning combinations, albeit with the amount of the winnings being reduced, the transparent windows could be programmed to display the video symbols that are the same as winning symbols already present on the reel. Thus, if the combination of "7" symbols produces a winning outcome for which the likelihood of achieving such an outcome is to be increased, then the transparent windows can be used to "add" three additional "7" symbols to the reels.

This concept of altering the theoretical payout table is described graphically in FIGS. 9A and 9B, which illustrate a hypothetical mechanical reel having one transparent window and the virtual reel that it produces. FIG. 9A depicts one to four symbol locations, with one symbol location being a transparent window. As shown in FIG. 9B, the transparent window can display symbol "D" in the first rotation and symbol "E" in the second rotation, and so on. The odds of achieving symbols "A," "B" or "C" in two rotations would be 1 in 4. Yet, the odds of achieving symbol "D" or "E" in those two rotations is 1 in 8. Alternatively, if one desired to increase the odds of achieving symbol "A," the video screen could produce an "A" video symbol that is seen through the transparent window. In this situation, the odds of achieving an "A" symbol in two rotations is 4 in 8 (i.e., 1 in 2) because two "A" symbols are possible in each rotation.

In the embodiments of FIGS. 4-8, the video display may create additional animation when a certain event occurs. For example, the video display may display animation when a win occurs. Or, the video display may provide some type of bonus game. If such animation is desired, after the win, the machine may need to move the transparent window to the display region so that the animation is visible to the player.

Figure 10B:
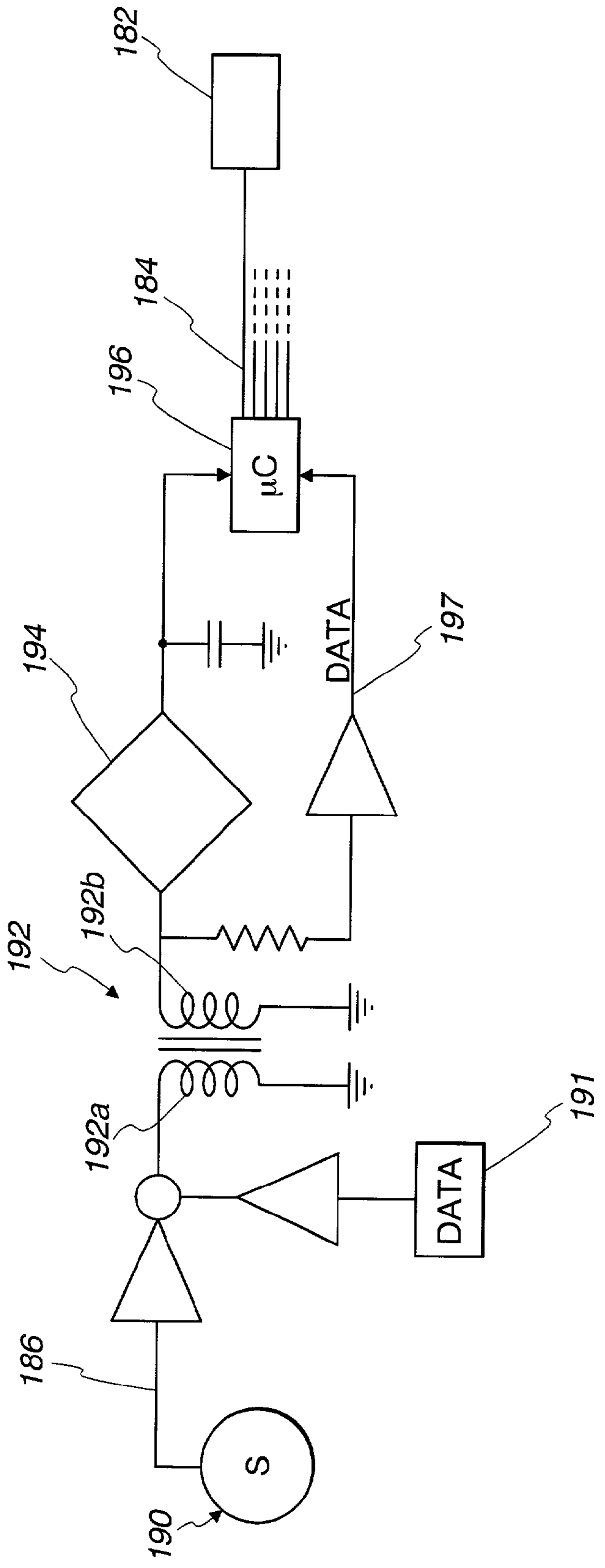
FIG. 10*b* illustrates one type of circuitry that could be used to supply power to the embodiment of FIG. 10*a*.

FIG. 10*a* illustrates yet another alternative in which the system 180 includes a reel having a plurality of video displays 182 at each symbol location. Each video display 182 is capable of displaying various video symbols, which provides the system 180 with the flexibility of a true video slot machine, while preserving the movement of mechanical reels that numerous slot machine players find desirable. The signal for producing the video symbols is transmitted to each video display 182 by a wire 184. A primary power cable 186 feeds the signals into the reel where the signals are distributed to the wires 184 (see FIG. 10*b*). The video displays 182 can be a liquid crystal display (LCD), dot matrix, vacuum fluorescence display, organic liquid crystal display (OLCD), LED array, Electronic paper, or any other display device capable of producing images.

To control the inputs to the video displays 182, circuitry using a transformer may be used as is shown in FIG. 10*b*. Power is supplied by a source 190 along the primary power cable 186. A transformer 192 includes a stator 192*a* and a rotor 192*b*. A bridge 194 is provided at the output of the transformer 192 for converting the alternating current into a direct current. A microcontroller 196 receives the inputs from the bridge 194.

In addition to the power source 190, the transformer 192 also receives data signals from a data source 191. These data signals are encoded signals on the alternating current and are received by the microcontroller 196 by a data line 197. The data signals provide the instructions for which video symbols are to be displayed by the video displays 182. The data source 191 would typically be the primary microprocessor for the gaming machine, which sends the signals to the reel corresponding to the random outcome it has selected in response to receiving a wager input. The microcontroller 196 then provides the signals to each of their video displays 182 over the corresponding wire 184 to display this outcome.

Preferably, there is one transformer 192 per reel. The stator 192*a*, including the primary winding and the core, is mounted in a fixed position along the axis of rotation of the reel. The rotor 192, comprised of the secondary winding, is mounted to the rotating portion of the reel 180 and rotates around the core of the stator 192*a*. The bridge 194 and the microcontroller 196, which is mounted on a circuit board, rotates with the reel. The microcontroller 196 includes either internal or external memory. The circuit board may also include other peripheral and lamp controllers.

FIG. 11 illustrates a reel system 200 having a display region 202 for viewing the symbols that determine the outcome of the game. The system 200 has three mechanical reels 212, 214, 216. Additionally, the system 200 has a video display device 218 that includes a screen 220 for displaying video symbols that form part of the display region 202 for determining the outcome of the game. Thus, the system 200 is provided with additional versatility by having one simulated reel that can be used to alter the payout table without altering the mechanical reels. Further, the screen 220 could be used for various diagnostic features for the game.

FIGS. 12*a* and 12*b* illustrate a reel 250 that can be used by itself or in conjunction with the embodiments of FIGS. 4-8. The reel 250 has a symbol location 252 which provides a compound symbol, which is a symbol that is capable of being visualized as more than one symbol. For the purposes of describing this feature of the present invention, the compound symbol is of the "bar symbol" genre. As an example, when the wavelength of light is 700 nanometers from a light source 254 (FIG. 12*a*), the bottom two bars 252*a*, 252*b* in the bar symbol are visible to the player, making the compound symbol appear like a double bar symbol. In this instance, the top bar 252*a* is not responsive to the light at 700 nanometers, such that it is not visible. Alternatively, when the wavelength is 400 nanometers (FIG. 12*b*), the top bar 252*a* appears visible to the player, while the bottom two bars 252*b*, 252*c* are not responsive. Thus, the overall appearance is a single bar symbol when 400 nanometer light is used.

The source 254 can be any kind of display device capable of providing various output wavelengths. In one preferred embodiment, the source 254 is an array of multi-colored LEDs. While colored bulbs may work, the LEDs are preferred since the bulbs get hot and burn out due to cycling, and white bulbs become yellow over time. In these situations, the LED is used for backlighting when non-compound symbols require such backlighting and for selective wavelength lighting when one or more features of a compound symbol require visualization. The source 254 can also be an electroluminescent element.

Further, the reel can include compound symbols at some locations and transparent windows in other locations to provide varying degrees of versatility. For such a system, the source 254 must also be able to provide video symbols for display through the transparent window.

The invention described in FIG. 12 contemplates using various wavelengths of energy to achieve the display of more than one symbol in one symbol location on the reel 250. For example, ultra-violet energy may be projected to cause the fluorescing of certain colored reel symbols so as to make them more visible, or a black light can be used to highlight certain symbol features in a compound symbol.

FIGS. 13*a*-13*d* illustrate another reel system 270 for developing a compound symbol, similar to that which is shown in FIG. 12. The system 270 includes a reel 272 with a polarizing filter 274 that controls the polarization state of the light emanating from a source 276. The polarized light is the backlighting for the reel 272 and causes a symbol 280 to be visible to a player of the game.

Figure 13A:
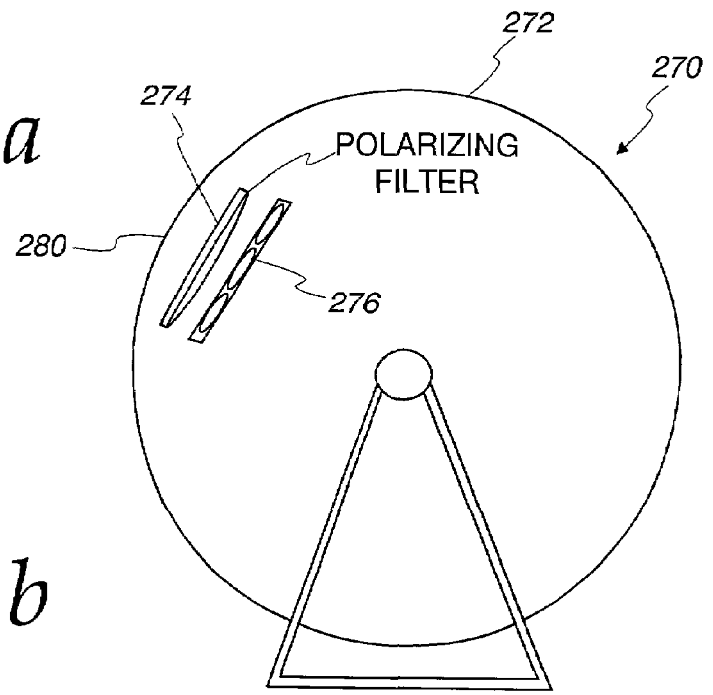
FIGS. 13*a*-13*d* illustrate a mechanical reel with a compound symbol at one symbol location that is produced by varying polarization states of light.
Figure 13B:
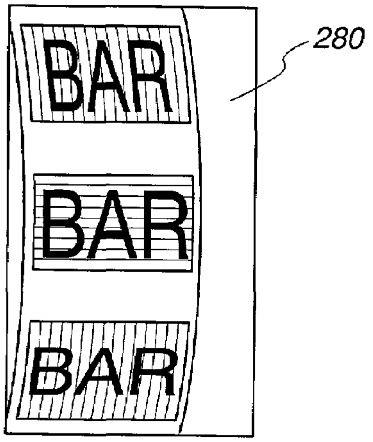

The exemplary symbol 280 shown in FIG. 13*b* is again a bar-type symbol. The top and bottom bars have an optical characteristic of permitting the passage of light when polarized in the vertical direction. The middle bar has an optical characteristic for permitting the passage of light when polarized in the horizontal direction. Such a symbol 280 can be made by having a polarized film for each bar.

Figure 13C:
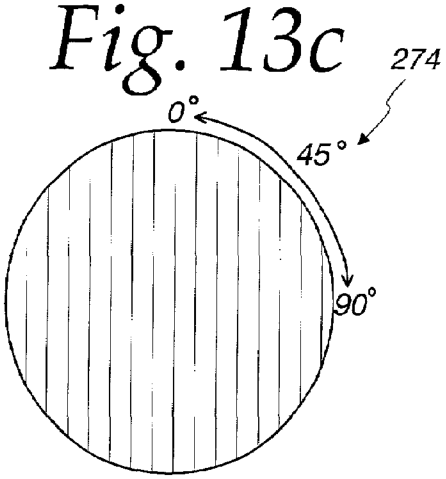

The filter 274, shown in FIG. 13*c*, is rotatable between 0 and 90 degrees. When oriented at 0 degrees, the light emanates with a vertical polarization. When oriented at 90 degrees, the light emanates with a horizontal polarization. By controlling the angular orientation of the filter 274, the polarization state of the light from the source 276 is controlled.

Figure 13D:
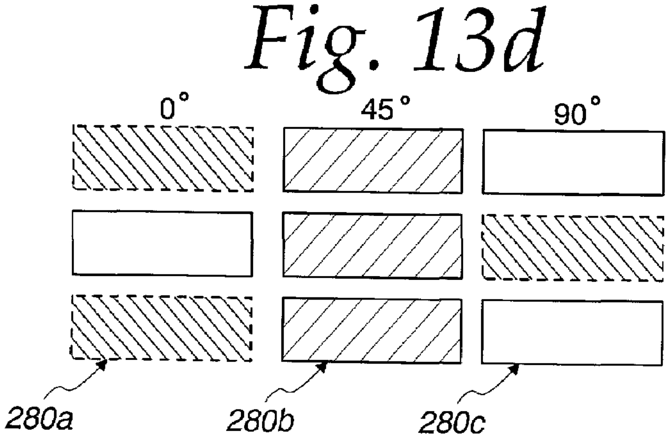

FIG. 13*d* illustrates the resultant visible symbol 280 that is displayed to the player as a function of the orientation angle of the filter 274. When at 0 degrees, the vertically polarized light causes the top and bottom bars to be visible while the middle bar is not visible, thereby creating a two bar symbol 280*a*. If the light is polarized horizontally by the filter 274 (i.e., at 90 degrees), then the middle bar is visible and the top and bottom bars are not visible, thereby creating a one bar symbol 280*c*. Finally, if the light is polarized by the filter 274 at 45 degrees, then all three bars transmit the same amount of light and all three are visible, thereby creating a three bar symbol 280*b*. It should be noted that the intensity of the three bars when the filter 274 is at 45 degrees is less than the intensity of the visible bars (one bar or two bars) when the filter 274 is at 0 or 90 degrees.

Accordingly, the system 270 provides for the creation of multiple symbols at one symbol location by adjusting the polarization state with the filter 274. While this system 270 has been described with a basic bar symbol that can be made to be three different symbols (one bar 280*b*, two bars 280*a*, or three bars 280*c*), the symbol location could contain features from other types of symbols, such as the number "7" symbol and a "cherry" symbol, wherein the first symbol is displayed with vertically polarized light and the second symbol is displayed with horizontally polarized light.

While the present invention has been described with reference to one or more particular embodiments, those skilled in the art will recognize that many changes may be made thereto without departing from the spirit and scope of the present invention. Each of these embodiments and obvious variations thereof is contemplated as falling within the spirit and scope of the claimed invention, which is set forth in the following claims.

What is claimed is:

1. A spinning reel slot machine, comprising:

an image display device having a surface for producing images of simulated mechanical reels;

a plurality of optical fibers have first ends optically coupled to said surface of said image display device and seconds ends for displaying said simulated mechanical reels to a player of said slot machine, at least some of said second ends defining a curved display surface having a radius of curvature that approximates a radius of curvature of a mechanical reel; and a flat transmissive window in front of and separated from said curved display surface.

2. The slot machine of claim 1, wherein all of said second ends define said curved display surface.

3. The slot machine of claim 1, wherein at least some of said second ends define a flat display surface adjacent to said curved display surface.

4. The slot machine of claim 3, wherein said flat display is configured to display alphanumeric information and said curved display surface is configured to display symbols on said simulated mechanical reels.

5. The slot machine of claim 1, wherein said radius of curvature is in the range of from about 4 to about 7 inches.

6. The slot machine of claim 1, wherein said image display device is a CRT display.

7. The slot machine according to claim 1, wherein said image display device is an LCD display.

8. The slot machine according to claim 1, wherein said image display device is an LED array.

9. A method of operating a slot machine, comprising:

selecting a random outcome in response to receiving a wager;

determining a symbol grouping corresponding to said random outcome; and displaying said symbol grouping on ends of an array of optical fibers, said ends defining a curved display surface having a radius of curvature that approximates a radius of curvature of a mechanical reel, said symbol groupings being representative of simulated mechanical reels.

10. The method of claim 9, wherein said displaying includes transmitting images of said symbol grouping through said optical fibers from an image source.

11. A gaming machine, comprising:

a processor configured to randomly select an outcome from a plurality of outcomes in response to receiving a wager;

an image display device having a surface for producing images, said images corresponding to said selected outcome of said plurality of outcomes; and a plurality of optical fibers have first ends optically coupled to said surface of said image display device and seconds ends for displaying said images to a player of said gaming machine to inform said player of said selected outcome of said plurality of outcomes, wherein at least some of said second ends define a flat display surface adjacent to said curved display surface.

12. The gaming machine of claim 11, wherein at least some of said second ends define a curved display surface having a radius of curvature that approximates the radius of curvature of a mechanical slot reel.

13. The gaming machine of claim 11, wherein at least some of said second ends define a flat display surface.

14. A gaming machine for playing a slots game, the gaming machine comprising:

a display region including at least one curved display surface that approximates a radius of curvature of a mechanical reel; and an image display device, spatially separated from the display region, for producing images of game indicia defining an outcome of the slots game, wherein the image display device projects the images of game indicia onto the at least one curved display surface such that the at least one curved display surface presents the projected images of the game indicia to a player.

15. The gaming machine of claim 14, wherein optical fibers are used to project the images from the image display device to the curved display surface.

16. The gaming machine of claim 14, wherein the game indicia comprise one or more reel symbols.

17. The gaming machine of claim 16, wherein the at least one curved display surface is stationary, and reel symbols are projected onto and caused to move across the at least one curved display surface in response to a wager input from a player.

18. The gaming machine of claim 14, wherein the image display device is selected from a group consisting of a CRT display, a liquid crystal display, dot matrix, vacuum fluorescent display, organic light emitting diode and LED array.

19. The gaming machine of claim 14, further comprising a panel located between the at least one curved display surface and a player, the at least one curved display surface being visible through the panel.

20. The gaming machine of claim 14, wherein the images comprise one or more animations.

21. A gaming machine for playing a slots game, the gaming machine comprising:

a mechanical reel comprising a curved display surface that approximates a radius of curvature of a mechanical reel; and an image display device, spatially separated from the curved display surface, configured to project images onto the curved display surface such that the curved display surface presents the projected images to a player, the images including a plurality of symbols that indicate at least a portion of a randomly selected outcome of the slots game.

22. The gaming machine of claim 21, wherein optical fibers are used to transfer the image from the image display device to the curved display surface.

23. The gaming machine of claim 21, further comprising a panel located between the curved display surface and a player, the curved display surface being visible through the panel.

24. The gaming machine of claim 21, wherein the images comprise one or more animations.

25. The gaming machine of claim 21, wherein the image display device is disposed behind the curved display surface and wherein the image display device is not immediately adjacent to the curved display surface.

* * * * *